US010263856B2

(12) United States Patent
Fried et al.

(10) Patent No.: US 10,263,856 B2
(45) Date of Patent: *Apr. 16, 2019

(54) DYNAMIC HIGHLIGHT

(71) Applicant: International Business Machines Corporation, Armonk, NY (US)

(72) Inventors: Eric P. Fried, Austin, TX (US); Carol B. Hernandez, Austin, TX (US); Susan T. K. Jasinski, Austin, TX (US); Kyle E. Johnson, Austin, TX (US); Kevin J. Kokal, Ashburn, VA (US); Andrew J. Lin, Sugar Land, TX (US); Jeremy J. Miller, Austin, TX (US); Natalie J. Miller, Austin, TX (US); Amartey S. Pearson, Austin, TX (US); Joshua R. Teal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/075,410

(22) Filed: Mar. 21, 2016

(65) Prior Publication Data

US 2017/0005880 A1 Jan. 5, 2017

Related U.S. Application Data

(63) Continuation of application No. 14/788,434, filed on Jun. 30, 2015.

(51) Int. Cl.
*H04L 12/24* (2006.01)
(52) U.S. Cl.
CPC .............. *H04L 41/22* (2013.01); *H04L 41/12* (2013.01)

(58) Field of Classification Search
CPC ...... H04L 41/12; H04L 41/22; G06F 11/0793; G06F 11/2028; G06F 3/0482; G06F 3/0484; G06F 9/5072
See application file for complete search history.

(56) References Cited

U.S. PATENT DOCUMENTS 7,640,259 B2 * 12/2009 Heger ............... G06F 17/30961
8,447,851 B1 * 5/2013 Anderson ........... G06F 11/3006
707/600

(Continued)

OTHER PUBLICATIONS

Bleikertz et al. "Cloud radar: near real-time detection of security failures in dynamic virtualized infrastructures", Proceedings of the 30th annual security application conference, pp. 26-35, ACM Dec. 8, 2014.*

(Continued)

*Primary Examiner* — Vivek Srivastava
*Assistant Examiner* — Todd L Barker
(74) *Attorney, Agent, or Firm* — Patterson + Sheridan, LLP (57) ABSTRACT

Embodiments disclosed herein generally relate to techniques for providing a visualization of connectivity between components in a computer network. One embodiment provides a method which includes receiving a configuration of a network comprising a plurality of components within a physical layer and a virtual layer. The method also includes generating a resource diagram identifying connections that are accessible among the components of the physical layer and components of the virtual layer. The method further includes, upon receiving a selection of one of the components, determining a subset of the plurality of components that are connected to the selected component, and altering the resource diagram to provide a visualization, within the resource diagram, of the connections between the selected (Continued)

component and the determined subset of the plurality of components.

10 Claims, 7 Drawing Sheets

(56) References Cited

U.S. PATENT DOCUMENTS

| | | | | |
|---|---|---|---|---|
| 8,495,217 | B2* | 7/2013 | Cyr | G06F 11/0793 |
| | | | | 709/203 |
| 9,137,118 | B2* | 9/2015 | Himura | H04L 41/12 |
| 9,219,687 | B2* | 12/2015 | Hooda | H04L 49/70 |
| 9,621,428 | B1* | 4/2017 | Lev | H04L 41/12 |
| 9,977,688 | B2* | 5/2018 | Nipane | G06F 9/45558 |
| 2004/0061701 | A1 | 4/2004 | Arquie et al. | |
| 2005/0088979 | A1* | 4/2005 | Mehra | H04L 45/02 |
| | | | | 370/254 |
| 2006/0095563 | A1 | 5/2006 | Benjamin et al. | |
| 2008/0052384 | A1* | 2/2008 | Marl | H04L 12/2807 |
| | | | | 709/223 |
| 2008/0052393 | A1* | 2/2008 | McNaughton | H04L 12/66 |
| | | | | 709/224 |
| 2008/0104213 | A1* | 5/2008 | McGee | H04L 41/083 |
| | | | | 709/223 |
| 2009/0073896 | A1* | 3/2009 | Gillingham | G06F 9/5061 |
| | | | | 370/255 |
| 2010/0189005 | A1* | 7/2010 | Bertani | H04W 74/02 |
| | | | | 370/252 |
| 2011/0283278 | A1 | 11/2011 | Murrell et al. | |
| 2012/0179837 | A1* | 7/2012 | Bender | H04L 67/1097 |
| | | | | 709/238 |
| 2014/0010109 | A1 | 1/2014 | Himura et al. | |
| 2014/0372927 | A1* | 12/2014 | Hebert | G06F 3/0484 |
| | | | | 715/771 |
| 2015/0180745 | A1* | 6/2015 | Horn | G06F 8/65 |
| | | | | 709/224 |
| 2015/0295781 | A1* | 10/2015 | Maes | G06F 9/5072 |
| | | | | 715/735 |
| 2017/0171061 | A1* | 6/2017 | Tessmer | H04L 45/16 |

OTHER PUBLICATIONS

Eyraud-Dubois, "A First Step Towards Automatically Building Network Representeations", 2007, Springer-Verlag, pp. 160-169.*
List of IBM Patents or Patent Applications Treated as Related.
Nabil Arman, "An Efficient Algorithm For Checking Path Existence Between Graph Vertices", Palestine Polytechnic University, Hebron, Palestine. <http://staff.ppu.edu/narman/cp4.pdf>.

* cited by examiner

DYNAMIC HIGHLIGHT

CROSS-REFERENCE TO RELATED APPLICATIONS

This application is a continuation of co-pending U.S. patent application Ser. No. 14/788,434, filed Jun. 30, 2015. The aforementioned related patent application is herein incorporated by reference in its entirety.

BACKGROUND

The present disclosure relates to techniques for managing computer networks, and more specifically, to techniques for providing a visualization of connectivity between components in a computer network.

Administrators of computing environments, such as data centers, increasingly employ virtualization as a tool to reduce costs associated with managing and maintaining several different hardware resources (e.g., servers, storage, network equipment) within a data center. Virtualization, in general, allows for the abstraction and partitioning of limited physical hardware resources, such as servers, ports, etc., into several virtual hardware resources, which can be applied, aggregated, and adapted as needed throughout the computing environment.

Due, in part, to the growing size of data centers and the increasing use of virtualization to manage the resources within the data centers, it is becoming increasingly difficult for administrators to determine the connectivity and relationships among the various physical and virtual resources. Accordingly, it may be helpful to provide techniques to aid administrators in managing computer networks.

SUMMARY

One embodiment presented herein describes a method. The method generally includes receiving a configuration of a network comprising a plurality of components within a physical layer and a virtual layer. The method also includes generating a resource diagram based on the received configuration. For example, the resource diagram identifies connections that are accessible among one or more of the components within the physical layer and one or more of the components within the virtual layer. The method further includes, upon selecting one of the plurality of components within the resource diagram, determining a subset of the plurality of components within the physical layer and the virtual layer that are connected to the selected component, and altering the resource diagram to provide a visualization, within the resource diagram, of connections between the selected component and the determined subset of the plurality of components

DETAILED DESCRIPTION

Embodiments presented herein describe techniques for generating and providing visualizations of relationships between resources or components in a computer network. In one embodiment, the network includes one or more servers within a data center. Physical resources of the servers within the data center may be abstracted or partitioned into virtual resources. A user may receive a configuration of the physical and virtual resources and use a set of management applications to generate a resource diagram that identifies accessible connections among the resources in the network. In one embodiment, when a user selects one of the components, the resource diagram may be altered to provide a visualization (e.g., highlighting, shading, grayscale, removing unconnected components, etc.), within the resource diagram, of components connected to the selected component.

Traditional methods for determining the relationships between resources in a network rely on look-up tables, spreadsheets, logs, etc, where the relationships and/or connections are specified. However, resource information kept in this format is hard to decipher, especially in cases where the amount of information within the spreadsheets is very large. For example, users or administrators typically have to view several pages of spreadsheets, use several look-up tables, etc. to determine the connections between resources for a given network. Thus, determining the layout of a particular network topology in this manner can be difficult and time-consuming. Moreover, even when a network topology has been determined (e.g., via a diagram, graph, etc.), the amount of information displayed in the diagram can be overwhelming to viewers observing the diagrams. In many cases, users may be interested in determining the role played by only a subset of the components in a given diagram. For example, in cases where maintenance has to be performed on a physical component, a user or administrator will typically want to determine the physical and/or virtual components in the network affected by the physical component that maintenance is performed on. The techniques mentioned above, however, are insufficient at providing users with information regarding roles played by particular components in a network.

Embodiments presented herein provide techniques for highlighting particular connections within a given resource diagram that are of interest to a viewer. As described in more detail below, the techniques presented herein can show all relevant connections between a component selected by the viewer and other components in the network topology represented by the resource diagram. This information can be shown (e.g., highlighted) to the user, whether the components are connected via point-to-point pathways or through a chain of intermediate pathways. Further, as opposed to trying to decipher relevant connections between components from a massive amount of interconnected components and connections displayed in the graphs, logs, and diagrams, techniques presented herein can quickly determine the relevant connections from any given selected component in the graph.

Figure 1:
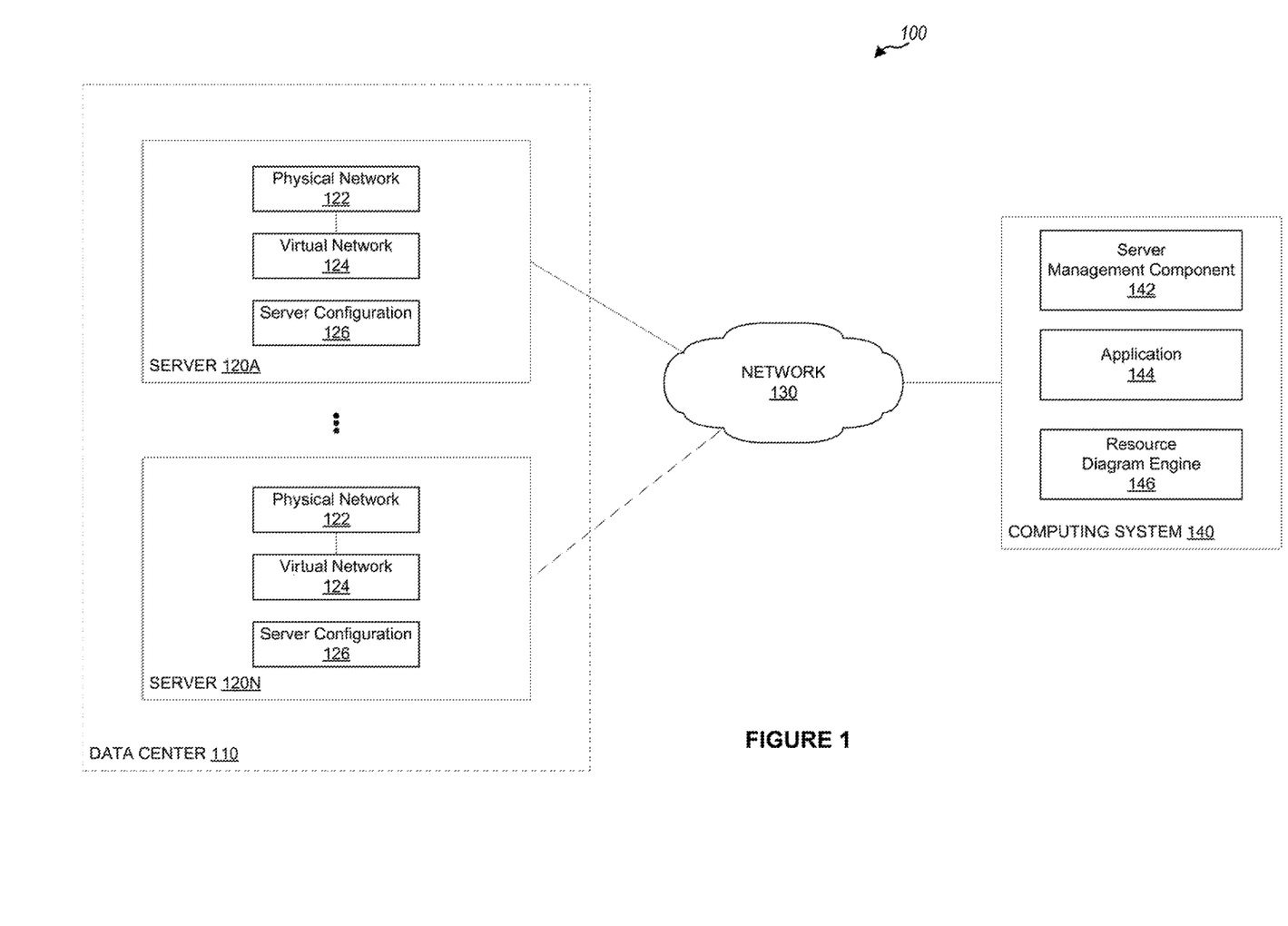
FIG. 1 illustrates an example computing environment, according to one embodiment.

FIG. 1 illustrates an example computing environment 100, according to one embodiment. As shown, the computing environment 100 includes a plurality of servers 120A-N (within a data center 110), where each of the plurality of servers 120A-N is connected via the network 130 to a computing system 140. In general, the network 130 may be a wide area network (WAN), local area network (LAN), wireless LAN (WLAN), etc. In a particular embodiment, the network 130 is the Internet. Further, in one embodiment, one or more of the plurality of servers 120A-N within the data center 110 can be pooled within one or more server pools to provide resources to one or more clients.

Each of the plurality of servers includes a physical network 122 connected to a virtual network 124. The physical network 122 includes computing hardware resources, such as processors, memory, physical input/output (I/O) resources, network cards, and the like. The virtual network 124 includes virtual computing resources abstracted (e.g., via virtualization) from one or more of the physical computing resources within the physical network 122. Examples of the virtual computing resources include virtual servers, logical partitions (e.g., virtual machines), virtual networks, virtual I/O resources, etc. One or more of the logical partitions may share the physical resources and may provide services to one or more clients.

The server configuration files 126 (within each of the servers 120A-N) specify the configuration of the different physical and/or virtual computing resources within the physical network 122 and the virtual network 124. For example, such configuration may describe the different physical and/or virtual resources within the servers, the amount of resources (physical and/or virtual) resources allocated, the relationships between the different physical and virtual resources, addresses assigned to each physical and/or virtual resource, and the like.

The computing system 140 is configured to provide management functions for one or more of the servers 120A-N. In one embodiment, the computing system 140 is an example of a management console that can be used to configure and/or manage the resources within the servers 120A-N. One example of a management console is the Hardware Management Console by International Business Machines®. As shown, the computing system 140 includes an application (or set of applications) 144 that provide an interface for configuring and/or operating partitioned (or virtualized) resources within the servers 120A-N, as well as managing the physical and virtual resources of the servers 120A-N. The application (or set of applications) 144 interact with a server management component 142 to perform resource management. For example, the server management component 142 can be used to perform a variety of operations on the servers 120A-N. Examples of operations include configuring and managing the (physical and/or virtual) resources, monitoring the operation of the resources, performing dynamic partitioning of the resources, activating and managing capacity on demand resources, assigning addresses to the resources, and the like. In one embodiment, the server management component 142 is configured to perform resource management responsive to a request from a user (or administrator) via the application 144.

As also shown, the computing system 140 includes a resource diagram engine 146 which performs the techniques presented herein. For example, as described in more detail below, in one embodiment, the resource diagram engine 146 is configured to provide a graphical display (e.g., a resource diagram) of the configuration of the different physical and virtual resources within each of the servers 120A-N. In one embodiment, the graphical display shows paths (or connections) between the physical resources accessible from each virtual resource. Additionally, the resource diagram engine 146 alters the resource diagram to highlight relevant information within the resource diagram that may be of interest to a viewer. As described below, the relevant information could be determined based on metadata associated with the components in the resource diagram. Further, the resource diagram engine 146 interacts with the application 144 and may provide the resource diagrams to the application 144 upon receiving a request (e.g., from a user, administrator, etc.) via the application 144.

Note, however, that FIG. 1 illustrates merely one possible arrangement of the computing environment 100. For example, although one computing system 140 is shown within the computing environment 100, the computing environment 100 could also include multiple computing systems 100 that are configured to perform resource management for the servers 120A-N and/or generate resource diagrams to aid in the management of the resources within the servers 120A-N.

Figure 2:
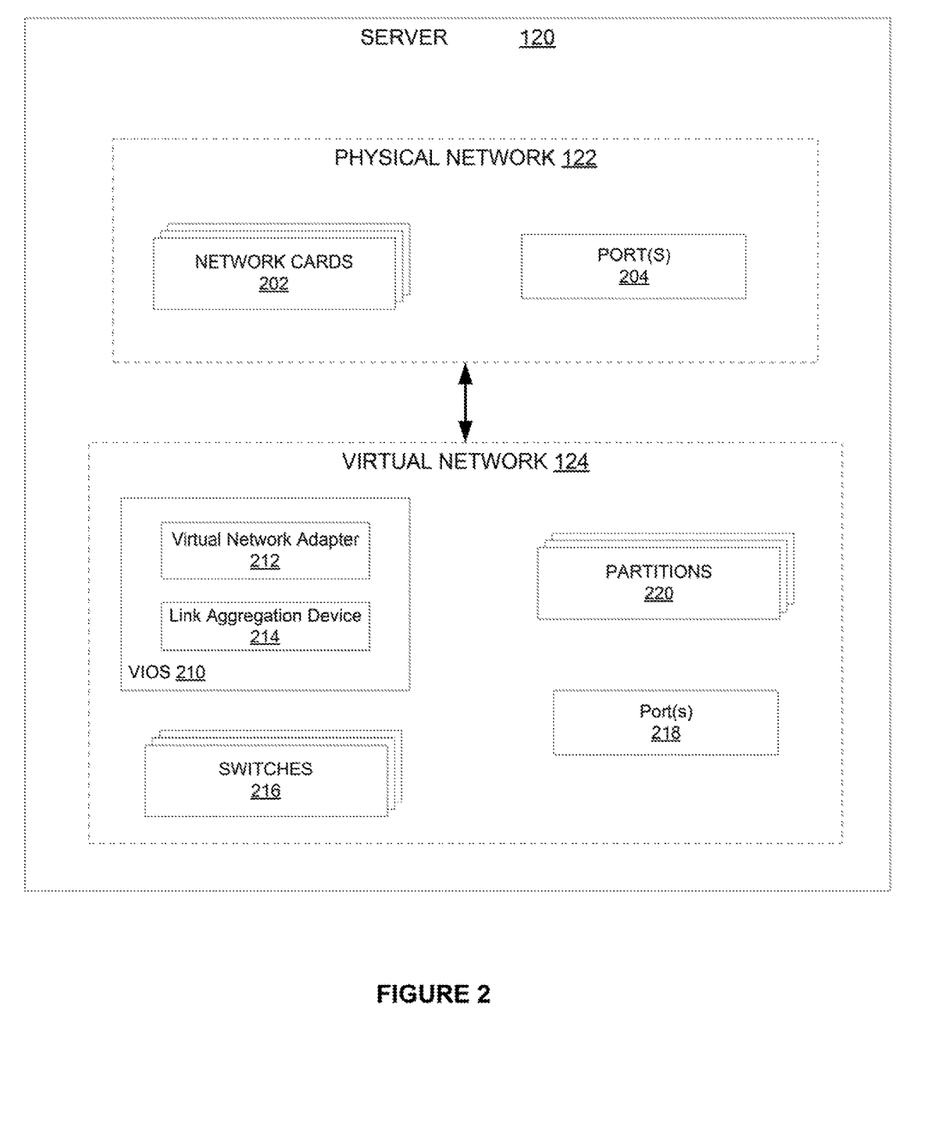
FIG. 2 illustrates an example of a physical network and virtual network in a server, according to one embodiment.

FIG. 2 further illustrates an example of physical and virtual resources within the physical and virtual networks described relative to FIG. 1, according to one embodiment. As shown, the physical network 122 of server 120 includes network cards 202 and a plurality of ports 204. In one embodiment, the network cards 202 are physical Ethernet card adapters and the ports 204 are the ports of the Ethernet card adapters. The physical network 122 can also include other physical I/O resources, processors, memory, and the like.

As also shown, in this embodiment, the virtual network 124 includes a virtual I/O server (VIOS) 210, virtual switches 216, a plurality of virtual ports 218 and partitions 220. As described above, the logical partitions (LPARs) 220 can be hosted within the servers 120A-N in order to provide services to different customers. The remaining virtual components (e.g., VIOS 210, switches 216, ports 218) within the virtual network 124 can be used to connect the partitions 220 to the various physical components within the physical network 122.

For example, the VIOS 210, in general, can be used to link the physical resources (e.g., network cards 202, ports 204) within the physical network 122 to the virtual resources (e.g., switches 216, ports 218, partitions 220, etc.) within the virtual network 124. As shown, the VIOS 210 includes a virtual network adapter 212 and a link aggregation device 214. The link aggregation device 214 is configured to aggregate (or bundle) multiple physical connections (e.g., via multiple physical ports 204) into one virtual connection. In an embodiment, the link aggregation device 214 is a virtual port configured to implement link aggregation control protocol (LACP) as defined in IEEE 802.3ad. After aggregating the multiple physical connections into one virtual connection/link, the virtual connection can be passed to the virtual network adapter 212, which is used as a bridge to connect the physical network to the virtual network. For example, in one embodiment, the virtual network adapter 212 is a shared Ethernet adapter (SEA) 212 that bridges a physical component (such as one of the ports 204 of the network card 202) or a single virtual link (from a link aggregation device) to one or more virtual components (such as one or more virtual ports 218). In an embodiment, the one or more virtual ports 218 could be one or more ports on a virtual switch, such as one of the virtual switches 216, which is responsible for connecting the various logical partitions 220 to the virtual network.

Figure 3:
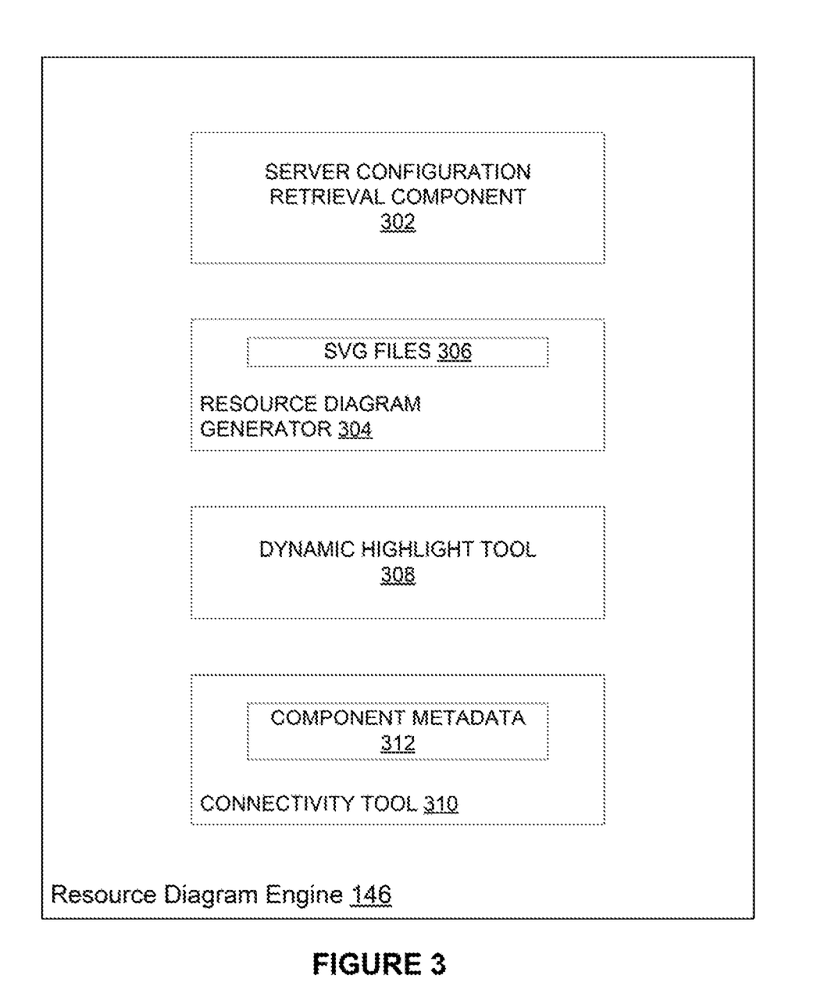
FIG. 3 illustrates a tool for generating resource diagrams, according to one embodiment.

FIG. 3 further illustrates an example of the resource diagram engine 146, described relative to FIG. 1, according to one embodiment. As shown, the resource diagram engine 146 includes a server configuration retrieval component 302, a resource diagram generator 304, a dynamic highlight tool 308 and a connectivity tool 310.

In one embodiment, the server configuration retrieval component 302 obtains the server configuration files 126 from the servers 120A-N upon receiving a request (e.g., from a user via application 144) to generate a graphical display (e.g., resource diagram) of the configuration of the physical and virtual resources within the servers 120A-N.

In one embodiment, the resource diagram generator 304 receives the server configuration files from the server configuration retrieval component 302 and defines the various physical and virtual components specified in the configuration files in a vector image format, such as scalable vector graphic (SVG) format. The resource diagram generator 304 may then use an editor (e.g., text editor, graphics editor, etc.) to generate/render a resource diagram of the configuration of the components based on the SVG files 306. The generated resource diagram may identify (or display) all accessible connections among the (physical and/or virtual) components in the resource diagram. In an embodiment, the generated resource diagram can be displayed to the user via the application 144. Note that although the present disclosure illustrates generating the resource diagram based on the SVG format, other similar formats can also be used in the generation of the resource diagram.

The resource diagram generator 304 also assigns various types of metadata to each of the components defined in the SVG files 306. An example of such metadata includes identifiers (or codes) that are unique to each of the components. In an embodiment, the values of the identifiers (or codes) can be based on addresses assigned to the components by the server management component 142. In another embodiment, the values of the identifiers (or codes) can be based on the particular configuration of the various components defined in the server configuration files and obtained by the server configuration retrieval component 302.

In one embodiment, the connectivity tool 310 determines, based on the component metadata 312, all the components within the resource diagram that are connected to a selected component. As described below, techniques presented herein allow the connectivity tool 310 to determine, component by component, what parent-child relationships exist for that individual component. For example, the connectivity tool 310 can determine whether each component within the resource diagram is connected to an adjacent neighbor (e.g., via one of the identified accessible paths) by comparing metadata values assigned to the adjacent neighbor node with metadata values assigned to the respective component. If the connectivity tool 310 determines that the respective component's metadata value corresponds to the adjacent neighbor node's metadata value, then the connectivity tool 310 determines that the adjacent neighbor node is connected to the respective component. The connectivity tool 310 then determines what parent-child relationships exist for the adjacent neighbor node (e.g., based on metadata associated with the adjacent neighbor node). In this manner, the connectivity tool 310 iterates recursively through a given resource diagram to determine relevant connections for a particular component selected in the diagram.

In one embodiment, the dynamic highlight tool 308 alters the generated resource diagram to provide a visualization of the connectivity determined by the connectivity tool 310. In some embodiments, when a user selects a particular component within the resource diagram, the dynamic highlight tool 308 is configured to alter the resource diagram as the connectivity tool 310 determines connectivity component by component throughout the resource diagram. The dynamic highlight tool 308 provides a visualization of the relevant connectivity within the resource diagram in several different manners. For example, the visualization may include, but not be limited to, highlighting (e.g., with color, shading, grayscale, etc.), removing unconnected components within the diagram (i.e., making the unconnected components disappear), magnification of the connected components, and others.

Figure 4:
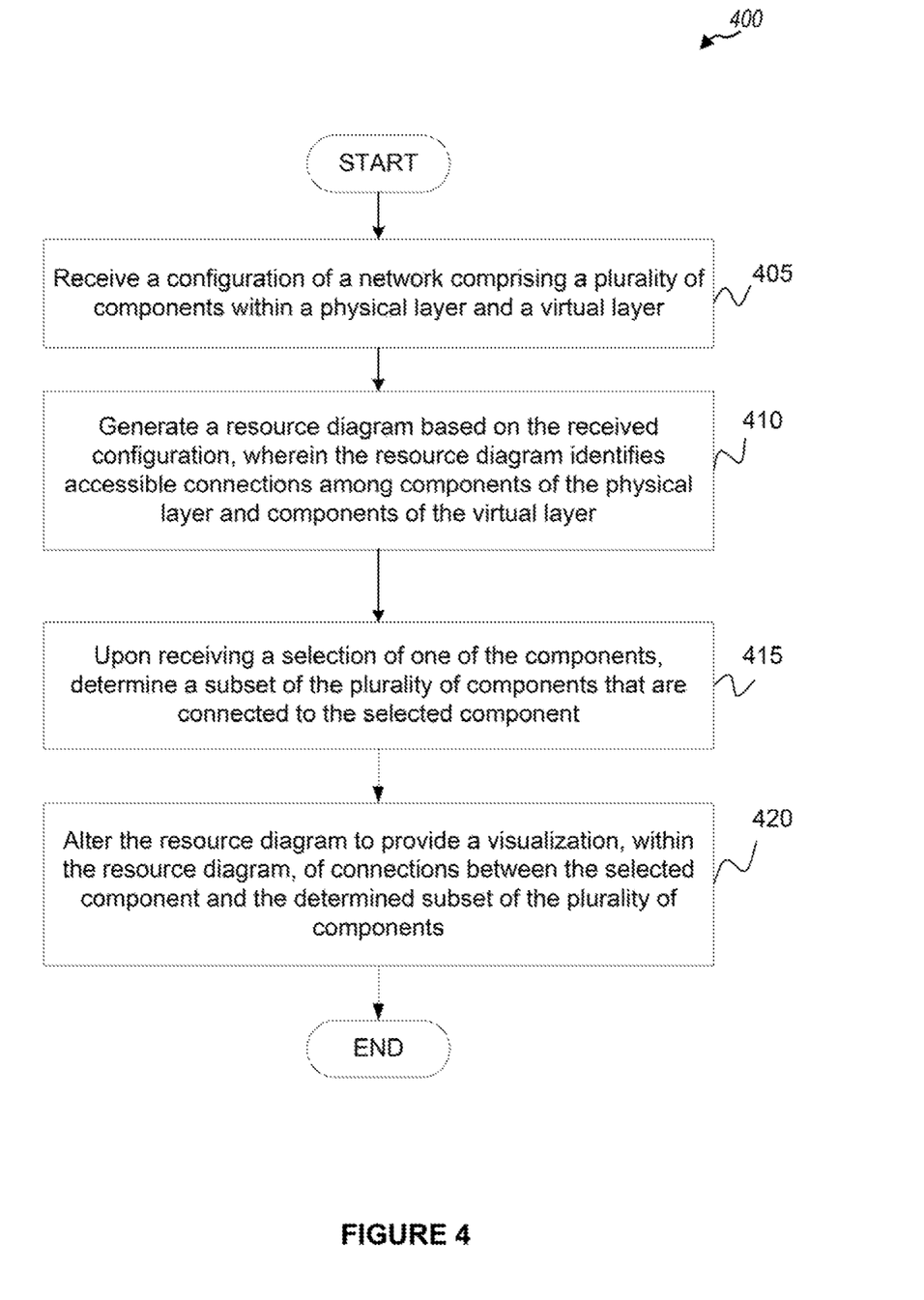
FIG. 4 illustrates a method for providing a visualization of connectivity within a resource diagram, according to one embodiment.

FIG. 4 illustrates a method 400 for providing a visualization of connectivity within a resource diagram, according to one embodiment. As shown, the method 400 begins at step 405, where the resource diagram engine 146 receives a configuration of a network that includes components within a physical layer and components within a virtual layer. As mentioned above, the physical layer may include various physical components, such as network cards, processors, memory, ports, etc. Similarly, the virtual layer may include various virtual components, such as logical partitions, virtual switches, virtual ports, etc.

At step 410, the resource diagram engine 146 generates a resource diagram (or a graph) identifying connections among and between components of the physical layer and components of the virtual layer. For example, as shown in FIG. 5 (for one embodiment), the generated resource diagram 500 shows the accessible connections among and between the physical network end of the diagram and the virtual partitions (e.g., virtual machines) that exist on the other end of the diagram.

Figure 5:
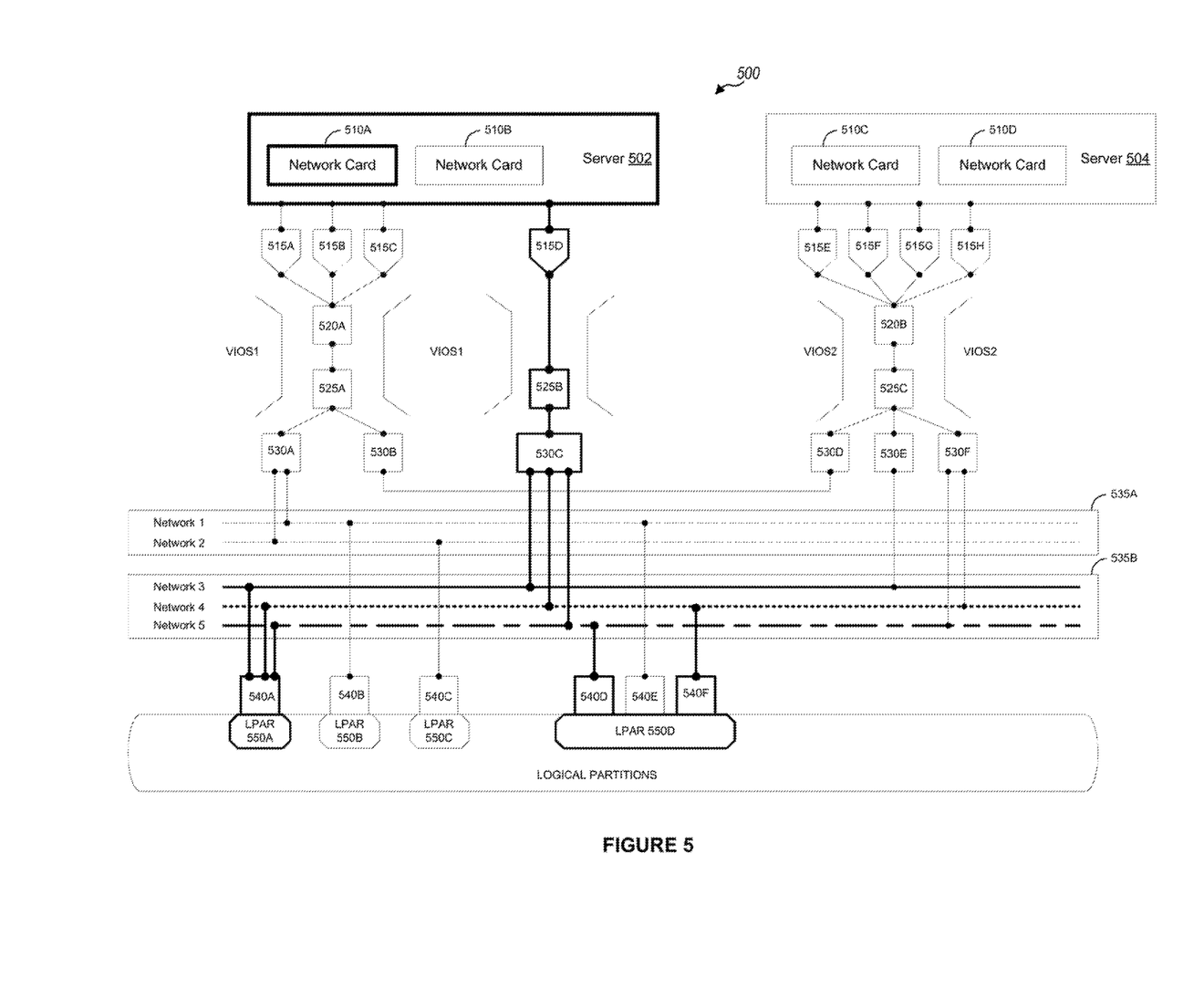
FIG. 5 illustrates an example of a resource diagram altered with connected components highlighted, according to one embodiment.

Specifically, in the embodiment depicted in FIG. 5, the generated resource diagram 500 shows two physical servers, server 502 and server 504. Each server 502, 504 includes two network cards 510 (e.g., network cards 510A-B for server 502 and network cards 510C and 510D for server 504). Each of the network cards 510A-D is connected to one or more physical ports 515A-H. In this embodiment, network cards 510A-B of the server 502 use ports 515A-D, and network cards 510C-D of the server 504 use ports 515E-H.

The resource diagram 500 also shows each one of the physical ports 515A-H connected to one of a link aggregation device 520A-B and a virtual network adapter (e.g., a SEA) 525A-525C within a VIOS. Each link aggregation device 520A-B is configured to receive n physical connections (where n>0) and provide 1 virtual link. The virtual link is then provided to a SEA 525A-C, which provides 1 to m virtual connections (where m>0) to one or more ports 530A-F on a virtual switch 535A-B. For example, as shown, physical ports 515A-C can be aggregated via the link aggregation device 520A into one virtual link that is provided to SEA 525A. SEA 525A then provides two virtual connections to virtual ports 530A-B on a virtual switch 535A. Similarly, physical ports 515E-H are aggregated (via link aggregation device 520B) into one virtual link that is provided to SEA 525C. SEA 525C then provides three virtual connections to virtual ports 530D-F on a virtual switch 535B. In the depicted embodiment, virtual port 530B of server 502 is shown connected to virtual port 530D of server 504. Such a connection may provide a redundant path for the network cards on the servers 502 and 504, for example, in the event one of the network cards fails.

Rather than physical ports being aggregated into a link aggregation device, a physical port can also be provided directly to a SEA. For example, as shown, physical port 515D is connected directly to a SEA 525B, which is connected to a virtual port 530C on a virtual switch 535B. Each of the virtual switches 535A-B provides access to one or more virtual local area networks (VLANs) (e.g., networks 1-5). Each of the networks is also connected (via virtual ports 540A-F) to one or more logical partitions (LPARs) 550A-D.

As such, the resource diagram 500 displays all connections that are accessible among and between the physical components of one or more servers and the virtual partitions created within the one or more servers. Note, however, that the resource diagram 500 illustrates merely one possible arrangement of a resource topology (of the physical and virtual components) within one or more servers. For example, in general, the resource diagram engine 146 is capable of generating any resource diagram that shows a resource topology, based on information obtained from server configuration files, and the like.

Referring now back to FIG. 4, once the resource diagram has been generated at step 410, when a user selects one of the components within the resource diagram, the resource diagram engine 146 determines (at step 415) a subset of the plurality of components within the resource diagram that are connected to the selected component. The resource diagram engine 146 then alters (at step 420) the resource diagram to provide a visualization, within the resource diagram, of connections between the selected component and the determined subset of the plurality of components. According to embodiments, the visualization of the connections between the subset of the components and the selected component may correspond to the components within the resource diagram that are of interest (or relevant) to the viewer. Further, as mentioned above, the visualization may come in various different forms and include any one of highlighting in a particular color, applying various amounts of shading, grayscale, etc., removing unconnected components, increasing the size of the accessible components relative to the unconnected components, reducing the size of the unconnected components relative to the accessible components, etc.

For example, referring back to FIG. 5, when a user selects the network card 510A, the resource diagram engine 146 may determine a subset of the components within the resource diagram 500 that are connected to the network card 510A. As shown, the resource diagram 500 is then altered to provide a visualization (e.g., with highlighting in this embodiment) of the connections between the network card 510A and the determined subset of the plurality of components. As shown in this embodiment, the determined subset of components include the physical port 515D, SEA 525B, virtual port 530C, virtual switch 535B, virtual port 540A of LPAR 550A and virtual ports 540D and 540F of LPAR 550D.

Note, however, that the highlighted path within resource diagram 500 illustrates merely one possible highlighted path (based on the selected component 510A). For example, although the highlighted path was determined upon selecting the network card 510 A, embodiments presented herein also allow for determining connectivity for any component, whether the component serves as an intermediate component (e.g., such as any of SEAs 525A-C, etc.) or endpoint (e.g., LPARs 550A-D, network cards 510A-D, etc.).

As such, embodiments presented herein allow a viewer of the resource diagram to quickly determine relevant connectivity of components of interest to the viewer (e.g., as opposed to traditional methods of determining connectivity). Such determinations can be made accurately (e.g., without human error) based on metadata for each component, and flexibly, since the resource diagrams can be generated any time, for example, upon request or upon a change in one of the resource configurations.

As mentioned above, rather than determining the entire parent-child relationship within a resource diagram for one component, embodiments presented herein enable the resource diagram engine 146 (e.g., via the connectivity tool 310) to determine parent-child connectivity component by component (e.g., determining iteratively whether a component is connected to any adjacent neighbor nodes). The resource diagram engine 146 (via the dynamic highlight tool 308) then highlights the relevant connection as it is determined component by component. Doing so in this manner reduces the latency associated with determining a given path in a resource diagram and allows for the visualization of the relevant connectivity within the resource diagram to be dynamic and responsive to a user.

Figure 6:
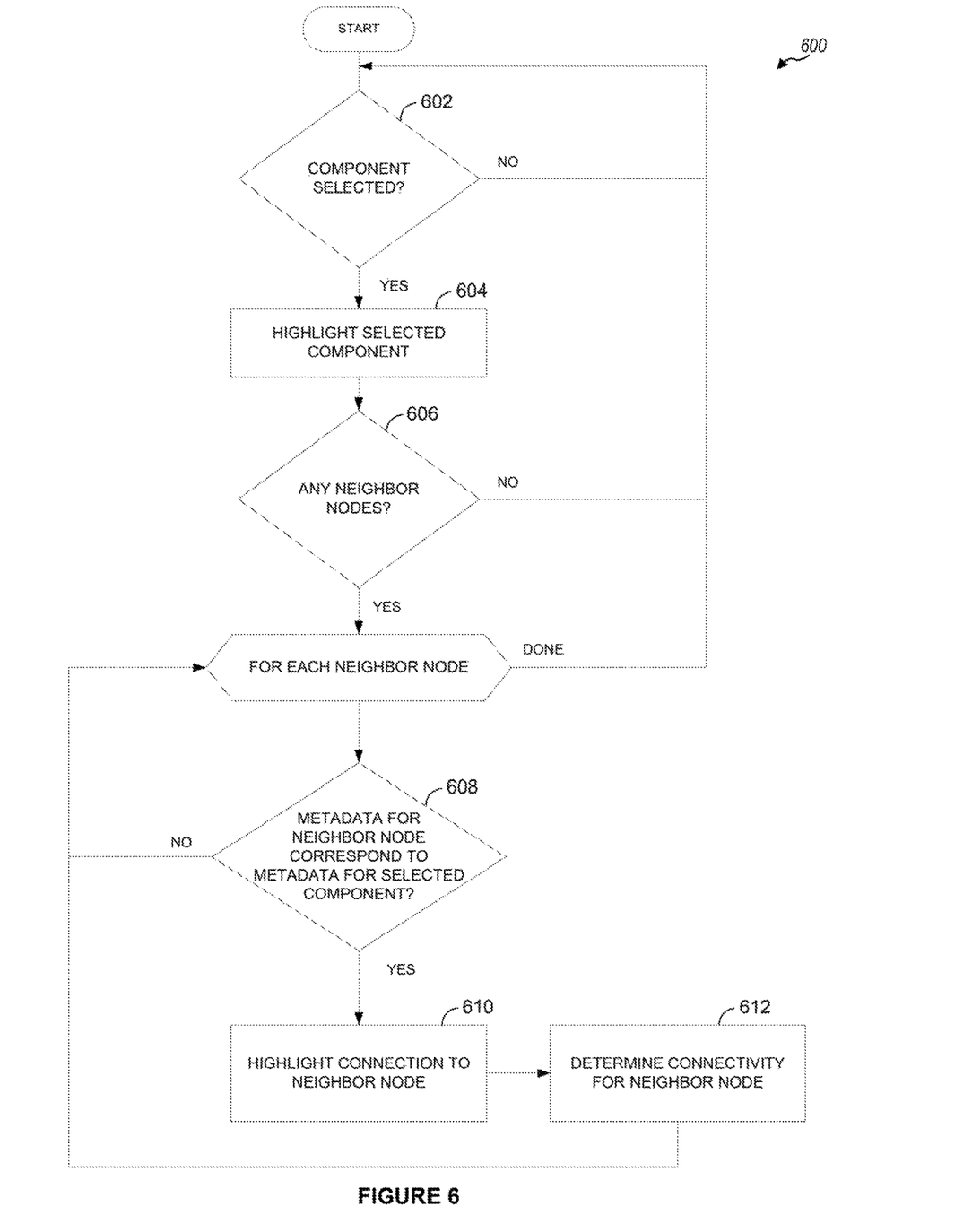
FIG. 6 illustrates a method for determining connectivity, according to one embodiment.

FIG. 6 illustrates a method 600 for determining connectivity within a resource diagram, according to one embodiment. The following steps in the method 600 may be performed for each component within the resource diagram, once a user selects one of the components.

As shown, the method 600 begins at step 602 where the dynamic highlight tool 308 determines whether a component has been selected. If so, then the dynamic highlight tool 308 highlights (at step 604) the selected component and the method proceeds to step 606. If the dynamic highlight tool 308 determines a component has not been selected, then the method returns to step 602. At step 606, the connectivity tool 310 determines if the selected component has adjacent neighbor nodes (e.g., based on the accessible paths between components in the generated resource diagram). If the connectivity tool 310 determines that the selected component has adjacent neighbor nodes, then, for each neighbor node, the connectivity tool 310 determines, based on metadata associated with the selected component, whether the neighbor node is connected to the component. For example, as shown at step 608, the connectivity tool 310 determines whether metadata associated with the neighbor node corresponds to metadata associated with the selected component. As mentioned above, in an embodiment, the metadata for the each of the components includes component codes (or identifiers). In this embodiment, if all or a certain portion of the code for the neighbor node corresponds to all or a certain portion of the code for the selected component, then the connectivity tool 310 determines that the neighbor node is connected to the component. If, however, at step 608, the connectivity tool 310 determines that the metadata value for the neighbor node does not correspond to the metadata value for the selected component, then step 608 is performed for the next neighbor node.

As shown, once the connectivity tool 310 determines that the neighbor node is connected to the component, at step 610, the dynamic highlight tool 308 highlights the connection to the neighbor node. At step 612, the connectivity tool 310 then determines connectivity for the neighbor node.

An example of the above method 600 is described with reference to the embodiment depicted in FIG. 5. As shown in FIG. 5, once a user selects network card 510A, the connectivity tool 310 determines (for the network card 510A) that network card 510B (e.g., from the right) and physical ports 515A-D (e.g., from below) are adjacent neighbor nodes to network card 510A. After the connectivity tool 310 compares metadata values associated with each of the neighbor nodes to the metadata value for network 510A, the connectivity tool 310 determines network card 510A is connected to physical port 515D. Accordingly, only the connection between the network card 510A and the physical port 515D is highlighted. The network card 510A then proceeds to determine the connectivity for physical port 515D.

For example, for physical port 515D, the connectivity tool 310 determines that network card 510A (e.g., from above) and SEA 525B (e.g., from below) are adjacent neighbor nodes to physical port 515D. After connectivity tool 310 compares metadata values associated with each of the neighbor nodes to the metadata value associated with the selected component, the connectivity tool 310 determines (e.g., based on the comparison) physical port 515D is connected to both network card 510A and SEA 525B. As the connection between the physical port 515D and the network card 510A is already highlighted, the dynamic highlight tool 308 only highlights the connection between the physical port 515D and the SEA 525B. The determination of connectivity, component by component, continues in this manner until the path (e.g., between network card 510A and LPARS 550A, 550D) is highlighted.

Accordingly, the embodiments presented herein allow the resource diagram engine 146 to determine (for each component) whether a particular accessible path or connection to a neighbor node is relevant (i.e., whether the neighbor node is connected to the component via the accessible path). For example, although a given resource diagram may show multiple accessible paths in a topology between a given component and one or more other nodes, in some cases, it is possible that only a subset of the nodes could actually be connected to the given component, or, in some cases, none of the nodes could be connected to the given component. As such, allowing the resource diagram engine 146 to determine each component's connectivity (e.g., based on metadata) allows the resource diagram engine 146 to quickly determine whether a given path (or connection) between the component and a node that is displayed in a resource diagram is relevant.

Figure 7:
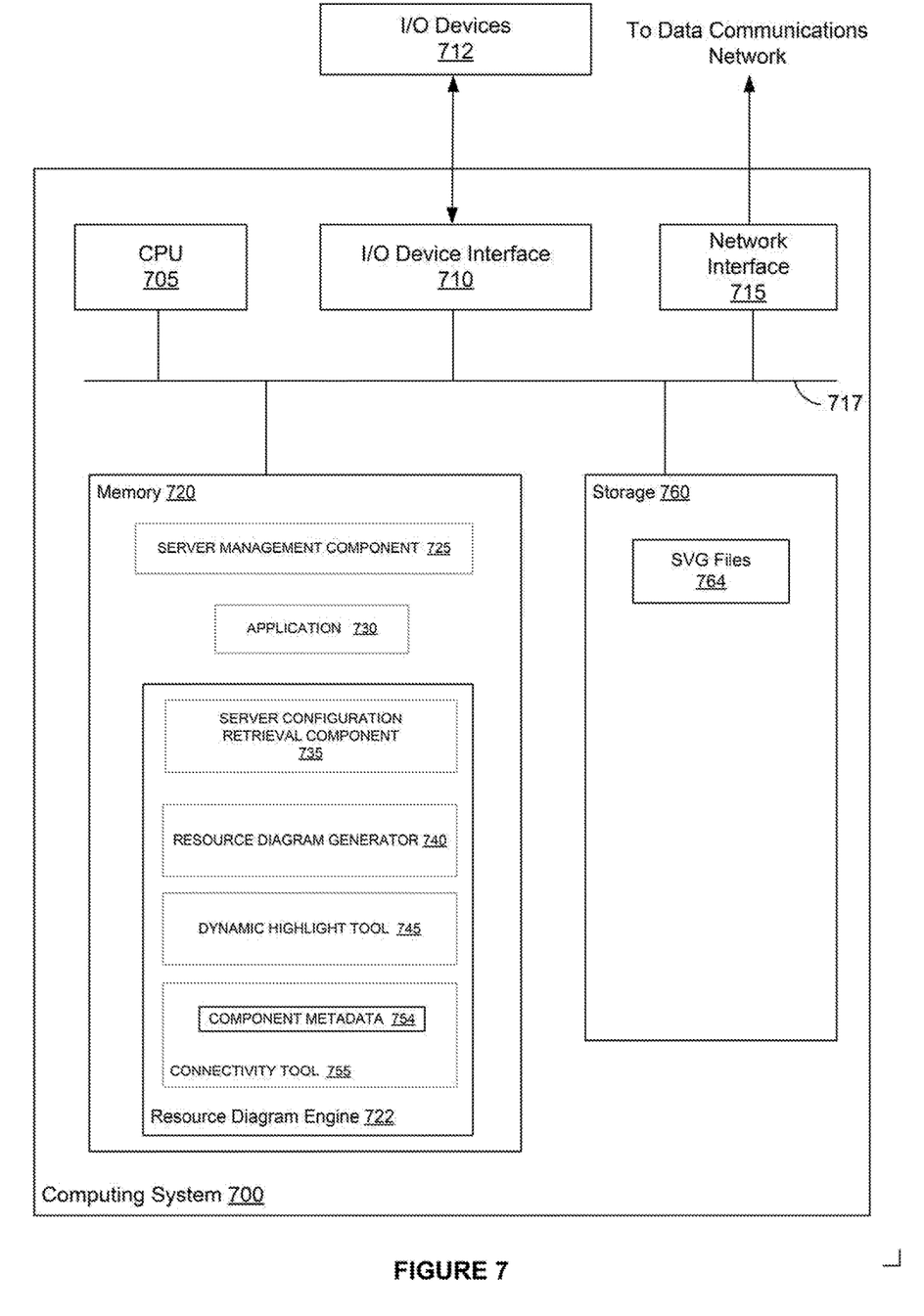
FIG. 7 illustrates a computing system configured to generate resource diagrams, according to one embodiment.

FIG. 7 illustrates a computing system 700 configured to provide a visualization, within a resource diagram, of relevant connectivity, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note, CPU 705 is included to be representative of a single CPU, multiple CPUs, a single CPU having multiple processing cores, and the like. Memory 720 is generally included to be representative of a random access memory. Storage 760 may be a disk drive storage device. Although shown as a single unit, storage 760 may be a combination of fixed and/or removable storage devices, such as fixed disc drives, removable memory cards, or optical storage, network attached storage (NAS), or a storage area-network (SAN).

Illustratively, the memory 720 includes a server management component 725, an application 730 and a resource diagram engine 722. The application 730 provides an interface for configuring and/or operating partitioned (or virtualized) resources within one or more servers. The server management component 725 interacts with the application 730 to perform resource management for the servers. The resource diagram engine 722 is configured to generate a graphical display (or resource diagram) of the topology of the physical and/or virtual resources within one or more servers. The resource diagram engine 722 includes a server configuration retrieval component 735, a resource diagram generator 740, a dynamic highlight tool 745 and a connectivity tool 755.

In an embodiment, the server configuration retrieval component 735 is configured to obtain configuration of the physical and/or virtual resources within one or more servers from server configuration files. The resource diagram generator 740 receives the configuration of the components from the server configuration retrieval component 735 and creates one or more SVG files 764 based on the server configuration files. The resource diagram generator 740 then uses an editor (e.g., text editor, graphics editor, etc.) to generate/render a resource diagram of the configuration of the components based on the SVG files. As shown, in this embodiment, the SVG files 764 are stored within storage 760. However, in another embodiment, the SVG files 764 can also be included in memory 720. The dynamic highlight tool 745 is configured to highlight relevant connections between components in the resource diagram. The dynamic highlight tool 745 interacts with the connectivity tool 755, which is configured to determine, based on component metadata 754, the relevant connections between the components upon a user selection.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a static random access memory (SRAM), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the proxy service) or related data available in the cloud. For example, the proxy service could execute on a trusted computing system in a cloud and perform SAN disk management operations to disk units on behalf of a client of the SAN provider. In such a case, the proxy service could obtain client configuration information and store such information at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:
1. A method, comprising:
 receiving a configuration of a network comprising a plurality of physical and virtual components, wherein the plurality of physical and virtual components are in a data center;

generating a resource diagram based on the received configuration, wherein the resource diagram displays connections that are accessible among one or more of the plurality of physical and virtual components; and upon receiving a selection of one of the plurality of components within the resource diagram:

determining a subset of the plurality of physical and virtual components that are connected to the selected component by:

determining a unique identifier of the selected component;

identifying one or more adjacent components of the selected component;

determining whether each of the one or more identified adjacent components is connected to the selected component by, for each respective adjacent component:

determining a respective unique identifier of the respective adjacent component; and determining whether at least a portion of the respective unique identifier of the respective adjacent component corresponds to at least a portion of the unique identifier of the selected component, wherein the respective adjacent component is connected to the selected component if the portion of the respective unique identifier of the respective adjacent component matches the portion of the unique identifier of the selected component;

identifying additional adjacent components of each connected adjacent component; and iteratively determining whether each additional adjacent component is connected to the respective connected adjacent component and identifying additional adjacent components of each connected additional adjacent component; and altering the resource diagram by modifying how the subset of components and connections among the subset of components are displayed.

2. The method of claim 1, wherein determining whether each of the one or more identified adjacent components is connected to the selected component comprises determining whether a parent-child relationship exists between the selected component and each of the one or more identified adjacent components.

3. The method of claim 2, wherein determining, for each respective adjacent component, whether at least a portion of the unique identifier of the respective adjacent component corresponds to a least a portion of the unique identifier of the selected component comprises extracting the unique identifier from metadata of the selected component and extracting the unique identifier from metadata of the respective adjacent component.

4. The method of claim 3, wherein the virtual components include a virtual link adapter, a virtual input/output server, a virtual switch, a virtual port, and a logical partition.

5. The method of claim 3, wherein the unique identifier of the selected component comprises a value based on an address assigned to the selected component.

6. The method of claim 1, wherein modifying how the subset of components and connections among the subset of components are displayed comprises at least one of: (i) highlighting the connections between the selected component and the determined subset of components, (ii) removing all unconnected components, (iii) shading the connections among the determined subset of components, and (iv) increasing a display size of the subset of components.

7. The method of claim 1, wherein the plurality of physical and virtual components comprises at least one virtual component, wherein the at least one virtual component is one of: (i) a virtual port, (ii) a logical partition (LPAR), (iii) a network virtual adapter, (iv) a virtual switch, and (v) a virtual input/output server (VIOS).

8. The method of claim 7, wherein the virtual port is configured to implement a link aggregation control protocol.

9. The method of claim 7, wherein the network virtual adapter is configured by the VIOS.

10. The method of claim 1, wherein determining the subset of the plurality of physical and virtual components that are connected to the selected component comprises iteratively determining connections component-by-component, thereby reducing the latency associated with determining connectivity in the resource diagram.

* * * * *